C. Faure.
Brushing & Finishing Hats.
N° 48235.   Patented Jun. 13, 1865.

Witnesses:
Wm Frewn
Theo Tusch

Inventor:
Cyprien Faure

UNITED STATES PATENT OFFICE.

CYPRIEN FAURE, OF NEW YORK, N. Y., ASSIGNOR TO HIMSELF AND HENRY J. YATES, OF SAME PLACE.

IMPROVEMENT IN MACHINES FOR BRUSHING HATS.

Specification forming part of Letters Patent No. 48,235, dated June 13, 1865.

*To all whom it may concern:*

Be it known that I, CYPRIEN FAURE, of the city, county, and State of New York, have invented a new and Improved Machine for Brushing Hats, &c.; and I do hereby declare that the following is a full, clear, and exact description thereof, which will enable others skilled in the art to make and use the same, reference being had to the accompanying drawings, forming part of this specification, in which—

Figure 1:
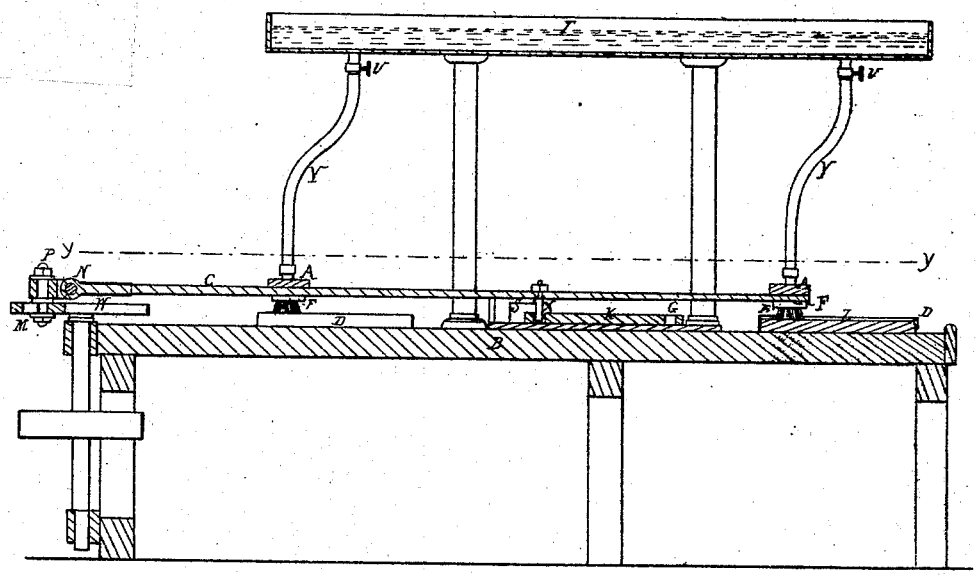
Figure 2:
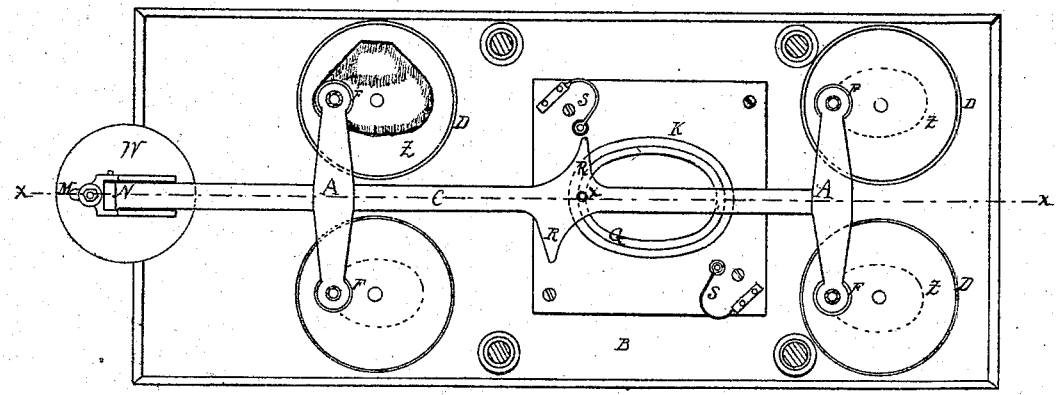

Figure 1 is a longitudinal vertical section of this invention, the line $x\ x$, Fig. 2, indicating the plane of section. Fig. 2 is a horizontal section of the same, the plane of section being indicated by the line $y\ y$, Fig. 1.

Similar letters of reference indicate like parts.

The object of this invention is to perform by machinery the operation of brushing felt hats, caps, &c., which is usually performed by manual labor, requiring great exertion and much time.

The nature of my invention and its peculiar construction will be readily understood from the following description.

B represents a work-bench, on one end of which is arranged a crank-wheel, W, mounted on an upright shaft, to which a revolving motion is imparted by a pulley or any other suitable means. This crank-wheel is provided with a radial slot, M, into which an adjustable crank-pin, P, is fitted, so that its stroke or throw can be regulated. Connected with this pin P is the reciprocating rod C by means of a common link, whereby a horizontal reciprocating motion is imparted to it; and, besides this link, said rod is provided with another link, N, the object of which is to allow the rod to be raised at will on one extremity without being obliged to disconnect it at the other end, where it connects with the crank-pin P.

The rod C is provided with arms A, extending from the same at right angles and at proper distances apart, and to the ends of each of these arms a felting-brush, F, is secured, which works on the surface of a felting-block, Z. A pin is secured in the rod C at about the middle of its length, and around this pin revolves a loose metallic thimble, in order to diminish the friction of said pin in the groove G, which is sunk in the guide-block K. This groove is oval or in any other desired shape, and it determines the motion of the felting-brushes.

In order to throw the rod over its dead-centers while following the guide-groove G, it is furnished with two cams, R, and springs S, bearing on these cams to throw the rod over the dead-centers. It must be remarked, however, that instead of the oval guide-groove other devices might be applied to produce the desired oval motion of the felting-brushes—such, for instance, as an oblong elliptical slot in the rod; or the ordinary motions of elliptographs might be employed; and I do not wish to confine myself to any particular method of producing the elliptical motion of the felting-brushes.

The felting-blocks Z are firmly secured to the work-bench, and each of them is provided with an adjustable metallic ring, D, which can be raised and lowered at will.

The felting-brushes connect by flexible pipes Y with a tank, T, containing steam, water, or any other liquid used in the operation of felting, and stop-cocks U in the upper ends of these pipes regulate the supply of liquid or steam to the brushes. When the ring D is raised the liquid is retained on the block while felting; but when the ring is depressed the liquid is allowed to flow off.

The operation is as follows: In order to introduce a hat under each brush, the rod C is raised at one end, and after the hats have been adjusted in the required position, as shown in red outlines in Fig. 2, the machine is started. By the action of the crank-pin P a circular reciprocating motion is imparted to the rod C, and by the guide-groove G this motion becomes oval, and by this groove the shape and extent of the travel of the felting-brushes is determined, the crank-pin P being adjustable for any length of throw that a guide-slot may require. By these means the motion and curves described by manual labor during the process of felting will be imitated with like results. By means of the joint N the rod C can be readily raised in order to change the hats and to adjust them on the felting-blocks. The supply of steam, water, or other liquid is regulated by the stop-cocks U, and by means of the rings D the liquid used during the operation can be retained on the felting-blocks or discharged therefrom, as may be desirable.

I claim as new and desire to secure by Letters Patent—

1. The brushes F and reciprocating rod C, constructed and arranged substantially as herein described.

2. The combination of a guide-groove, G, and pin X, or their equivalents, with the reciprocating rod C and brushes F, substantially as and for the purpose set forth.

3. The application of the joint N, in combination with the rod C, brushes F, and blocks Z, substantially as and for the purpose described.

4. The adjustable rings D, in combination with the felting-blocks Z, constructed and operating substantially as and for the purpose specified.

CYPRIEN FAURE.

Witnesses:
M. M. LIVINGSTON,
WM. P. McNAMARA.